(12) United States Patent
Zhao

(10) Patent No.: US 9,726,823 B2
(45) Date of Patent: Aug. 8, 2017

(54) OPTICAL FIBER CUTTING KNIFE

(75) Inventor: Yangri Zhao, Weihai (CN)

(73) Assignee: Inno Instrument (China) INC., Weihai (CN)

( * ) Notice: Subject to any disclaimer, the term of this patent is extended or adjusted under 35 U.S.C. 154(b) by 72 days.

(21) Appl. No.: 14/377,766

(22) PCT Filed: Feb. 20, 2012

(86) PCT No.: PCT/CN2012/000193
§ 371 (c)(1),
(2), (4) Date: Aug. 8, 2014

(87) PCT Pub. No.: WO2013/123608
PCT Pub. Date: Aug. 29, 2013

(65) Prior Publication Data
US 2015/0323740 A1    Nov. 12, 2015

(51) Int. Cl.
| | |
|---|---|
| *B26D 7/10* | (2006.01) |
| *B26D 5/08* | (2006.01) |
| *B26F 3/00* | (2006.01) |
| *B65H 35/00* | (2006.01) |
| *G02B 6/25* | (2006.01) |
| *B26D 3/16* | (2006.01) |
| *B26D 7/00* | (2006.01) |

(52) U.S. Cl.
CPC .............. *G02B 6/25* (2013.01); *B26D 3/16* (2013.01); *B26D 7/0006* (2013.01); *Y10T 83/8748* (2015.04)

(58) Field of Classification Search
CPC .......... G02B 6/25; B26D 7/0006; B26D 3/16; Y10T 83/8748
USPC ......... 225/2, 96, 101, 93, 103, 96.5; 83/170, 83/14, 563; 125/23 R
See application file for complete search history.

(56) References Cited

U.S. PATENT DOCUMENTS

| | | | | |
|---|---|---|---|---|
| 4,159,793 A | * | 7/1979 | Belmonte | B26F 3/002 225/101 |
| 4,667,862 A | * | 5/1987 | Millar | G02B 6/25 225/101 |
| 5,031,321 A | * | 7/1991 | Briscoe | G02B 6/25 225/96.5 |
| 5,040,968 A | * | 8/1991 | Kraiss | B28B 21/56 264/312 |
| 5,188,268 A | * | 2/1993 | Hakoun | B26D 7/14 225/105 |

(Continued)

*Primary Examiner* — Ghassem Alie
*Assistant Examiner* — Bharat C Patel
(74) *Attorney, Agent, or Firm* — Anova Law Group, PLLC

(57) ABSTRACT

The present disclosure provides an optical fiber cutting knife, including: a cutting tool post, a head cover, a fiber placing groove, a blade guide rail, and a blade fixed on the blade guide rail, at least a first magnet of a first polarity installed in the blade guide rail, and at least a second magnet of a first polarity and at least a third magnet of a second polarity installed on the cutting tool post, the head cover being installed on the cutting tool post, the fiber placing groove being installed inside the cutting tool post, and the blade guide rail being placed on an outside of the cutting tool post. The first magnet moves from a location corresponding to a second magnet to a location corresponding to a third magnet to form an automatic blade-retracting mechanism to automatically reset a position of the blade guide rail.

19 Claims, 4 Drawing Sheets

(56) References Cited

U.S. PATENT DOCUMENTS

| | | | | |
|---|---|---|---|---|
| 5,395,025 | A * | 3/1995 | Borer | G02B 6/25 225/102 |
| 5,839,338 | A * | 11/1998 | Tcholakov | B21F 11/00 83/375 |
| 5,901,449 | A * | 5/1999 | Ulbrich | B26D 3/169 30/278 |
| 6,536,121 | B1 * | 3/2003 | Ishikawa | C03B 33/10 225/96 |
| 6,598,508 | B1 * | 7/2003 | Ishikawa | B26D 5/08 83/613 |
| 6,668,128 | B2 * | 12/2003 | Hattori | G02B 6/245 385/134 |
| 6,754,426 | B2 * | 6/2004 | Lee | G02B 6/25 225/93 |
| 6,801,705 | B2 * | 10/2004 | Sasaki | G02B 6/25 225/93 |
| 6,978,071 | B2 * | 12/2005 | Hwang | G02B 6/245 225/21 |
| 7,025,239 | B2 * | 4/2006 | Itano | G02B 6/25 225/103 |
| 7,070,078 | B2 * | 7/2006 | Song | B26D 1/18 225/105 |
| 7,681,476 | B2 * | 3/2010 | Fritsche | G02B 6/245 30/90.4 |
| 7,690,529 | B2 * | 4/2010 | Kim | B65B 5/103 221/133 |
| 7,809,231 | B2 * | 10/2010 | Pracklein | G02B 6/25 385/134 |
| 8,092,100 | B2 * | 1/2012 | Song | G02B 6/245 385/134 |
| 8,177,189 | B2 * | 5/2012 | Jackson | A62C 35/68 169/20 |
| 8,254,739 | B2 * | 8/2012 | Bylander | B26F 3/002 225/96.5 |
| 8,291,803 | B2 * | 10/2012 | Honma | G02B 6/25 225/93 |
| 8,746,525 | B2 * | 6/2014 | Pepin | G02B 6/25 225/96.5 |
| 8,960,428 | B2 * | 2/2015 | Hasegawa | G02B 6/25 206/349 |
| 8,984,996 | B2 * | 3/2015 | Zhao | G02B 6/46 83/167 |
| 8,998,682 | B2 * | 4/2015 | Christopher | G02B 6/25 225/96.5 |
| 9,016,178 | B2 * | 4/2015 | Wadsworth | B26D 1/40 493/288 |
| 9,016,535 | B2 * | 4/2015 | Hasegawa | G02B 6/25 225/96 |
| 9,229,166 | B2 * | 1/2016 | Hasegawa | G02B 6/25 225/96 |
| 2002/0073815 | A1 * | 6/2002 | Dean | G02B 6/25 83/24 |
| 2004/0040158 | A1 * | 3/2004 | Stalder | B23D 29/023 30/90.1 |
| 2007/0039444 | A1 * | 2/2007 | Breyer | B26D 1/60 83/734 |
| 2010/0044406 | A1 * | 2/2010 | Ohmura | B26F 3/002 225/2 |
| 2010/0163593 | A1 * | 7/2010 | Song | G02B 6/25 225/96 |
| 2010/0187276 | A1 * | 7/2010 | Ohmura | G02B 6/25 225/2 |
| 2012/0141082 | A1 * | 6/2012 | Sawicki | G02B 6/25 385/134 |
| 2014/0000434 | A1 * | 1/2014 | Hasegawa | G02B 6/25 83/887 |
| 2014/0151425 | A1 * | 6/2014 | Hasegawa | G02B 6/25 225/96 |

* cited by examiner

OPTICAL FIBER CUTTING KNIFE

TECHNICAL FIELD

The utility model relates to optical fiber cutting device, and in particular relates to a kind of optical fiber cutting knife used for cutting fiber in the fiber welding process.

BACKGROUND ART

The current conventional optical fiber cutting knife operates in this manner: firstly close the fiber clamp cover, then push the knife to cut fiber manually, and the blade guide rail should not automatically return after cutting fiber, and should be pushed to reset by the operator to cut the next fiber, and thus the cutting efficiency is low, and the reset process is so easy to be ignored affecting the following work.

The decorative head cover of the existing optical fiber cutting knife is of the ornamental protuberance design. But in the actual operation, the protuberant decorative head cover is lack of practicality.

A hammer is set on the back of the decorative head cover, a spring is set between the hammer and the decorative head cover, and a bulge is set on the blade guide rail. When the optical fiber cutting knife works, that is, the head cover is closed, the hammer collides with the bulge of the blade guide rail, the hammer retracts upward due to the force from the bulge of the blade guide rail, and the spring is in the compression status. When the blade guide rail is pushed for optical fiber cutting, the bulge of the blade guide rail slides along with the blade guide rail, and abrades with the hammer at the same time, until it reaches the location where there is no contact with the hammer, and the hammer bumps downward under the tension of the top spring and stuck the edge of the bulge of the blade guide rail at the same time. So the optical fiber cutting process is over. Push up the head cover, and the hammer no longer sticks the edge of the bulge of the blade guide rail. It means that the blade guide rail can be reset and the cutting knife enters working status again. It can be seen from the above on the usage of the hammer that the friction frequency of the hammer of the optical fiber cutting knife is very high. Thus the hammer belongs to the easy aging component, so how to improve the abrasion resistance and service life of the hammer is an urgent problem to be solved for those workers skilled in the field.

In addition, the optical fiber collector is used to collect the waste fiber after cutting. The collector is of small size, and easy to operate. The collector is installed on the external of the optical fiber cutting knife, enabling collecting in a timely and effective manner after cutting waste fiber, avoiding the pollution of the environment, and improving the work efficiency. But to realize it, we should make the fiber collector keep a stable open or closed status in the process of operation, if necessary, and make the structure simple.

SUMMARY OF THE UTILITY MODEL

The utility model provides an optical fiber cutting knife, equipped with the blade guide rail automatic reset mechanism after cutting and improving the operation practicability of the decoration head cover and the wear-resisting performance of the hammer, in order to solve the problem of that the low efficiency of the existing technology of optical fiber cutting knife, the lack of practicability of the decorative head cover and the fact that the hammer of the optical fiber cutting knife is easy to wear and tear.

In order to overcome the problem in the existing technology of optical fiber collector, achieving the steady open or closed by the simple structure, the utility model also provides a fiber collector that can open or close the optical fiber cutting knife stably.

The utility model achieves the purpose by the following technical solution: an optical fiber cutting knife includes the cutting tool post, head cover, fiber placing groove, blade guide rail and a blade fixed on the blade guide rail. The head cover is installed on the cutting tool post, the fiber placing groove is installed inside the cutting tool post, and the blade guide rail is placed on the outside of the cutting tool post. The automatic blade-retracting mechanism is also set on the said optical fiber cutting knife, and the said mechanism is composed of several similar or dissimilar magnets set on the cutting tool post and the blade guide rail respectively. The top of the said head cover is a flat structure decorative cover. A wear-resisting layer or lubrication coating layer is set on the hammer on the back of the said decorative cover.

Preferably, No. 1 magnet is installed in the blade guide rail, and at least No. 2 magnet and No. 3 magnet are set on the cutting tool post respectively. The said No. 1 magnet and No. 2 magnet are similar, No. 1 magnet and No. 3 magnet are dissimilar, and the said No. 3 magnet is in the position where the said blade will automatically reset.

Preferably, the said No. 2 magnet locates around the position where the said No. 1 magnet arrives guided by the said blade.

Preferably, the magnetism of the said No. 2 magnet is stronger than the one of the said No. 1.

Preferably, an optical fiber collector is set outside the said cutting tool post and near one side of the blade, and the magnetic block and magnetic column are correspondingly set on the top shell and the bottom shell of the said optical fiber collector in order to make the top shell and bottom shell of the collector keep in stable status of open and/or closed.

Preferably, No. 1 magnetic block and No. 1 magnetic column are set correspondingly at the pin joint of the top shell and bottom shell of the said optical fiber collector.

Preferably, No. 2 magnetic block and No. 2 magnetic column are correspondingly set at the open and closed end of the top shell and bottom shell of the said optical fiber collector.

Preferably, the magnetism of the said No. 1 magnet is stronger than the one of the said No. 2.

An optical fiber cutting knife includes a cutting tool post, head cover, blade guide rail and a blade fixed on the blade guide rail; the head cover is installed on the cutting tool post, and the blade guide rail is placed on the outside of the cutting tool post, the top of the said head cover is a decorative cover with flat structure; a wear-resisting layer or lubrication coating layer is set on the hammer on the back of the said decorative cover.

Preferably, an optical fiber collector is set outside the said cutting tool post and near one side of the blade, and the magnetic block and magnetic column are correspondingly set on the top shell and the bottom shell of the optical fiber collector in order to make the top shell and bottom shell of the collector keep in stable status of opening and/or closing.

Preferably, No. 1 magnetic block and No. 1 magnetic column are set correspondingly at the pin joint of the top shell and bottom shell of the said optical fiber collector.

Preferably, No. 2 magnetic block and No. 2 magnetic column are correspondingly set at the open and closed end of the top shell and bottom shell of the said optical fiber collector.

Preferably, the magnetism of the said No. 1 magnet is stronger than the one of the said No. 2.

Compared with the existing technology, the utility model has the following beneficial effects:

1. The utility model provides the fiber cutting knife for cutting hair thin fiber, and realizes that the cut fiber surface is still flat observing with a magnifying glass of hundreds of times, ensuring the successful discharge welding of the cut two flat optical fibers in the welding machine. And the utility model of optical fiber cutting knife can make the blade guide rail automatic reset after cutting fiber, making the cutting more efficient and stable.

2. The decorative head cover is changed into a practical flat structure from the original ornamental protuberance structure, and the decorative head cover can be used as a small work station to hold the welded fiber, greatly increasing the practicality in the process of actual operation.

3. The spray lubrication and wear handling to the hammer greatly improve the wear resistance of the actual operation and improve the working life, so as to improve the service life of the whole optical fiber cutting knife.

4. The utility model of optical fiber collector utilizes the magnetic force to control fiber collector to open and close, making the fiber collector keep open or closed status stably if necessary. The process is simple, easy to use, and of the good use effect.

EMBODIMENT

Figure 1:
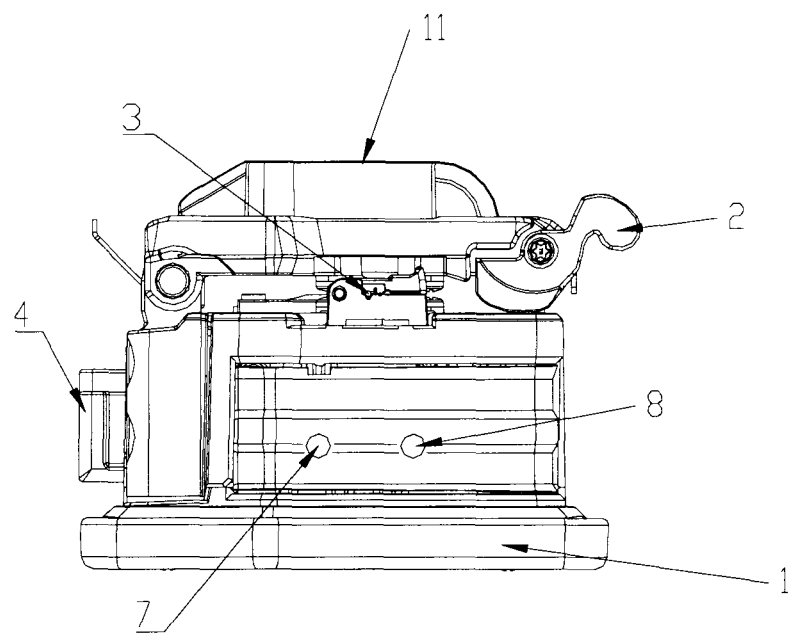
FIG. 1 is the main view of an embodiment of the utility model.
Figure 2:
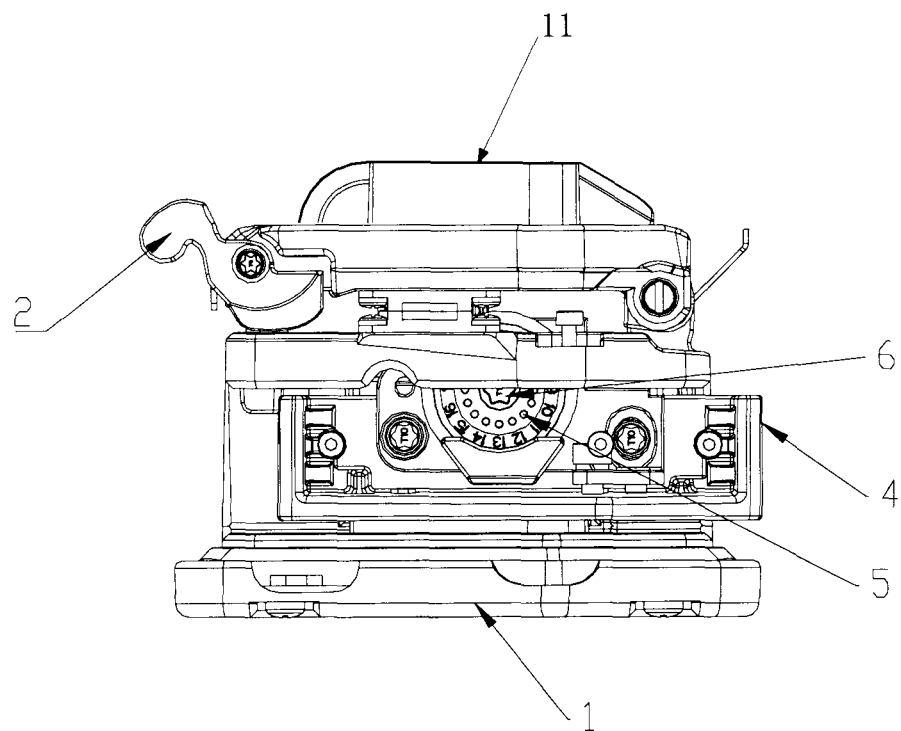
FIG. 2 is the rear view of an embodiment of the utility model.

The utility model is described in details with the appended drawings below.

As shown in FIG. 1-7, an optical fiber cutting knife includes the cutting tool post 1, head cover 2, fiber placing groove 3, blade guide rail 4, and a blade 5 fixed on the blade guide rail 4. The head cover 2 is installed on the cutting tool post 1, the fiber placing groove 3 is installed inside the cutting tool post 1, and the blade guide rail 4 is placed on the outside of the cutting tool post 1. The automatic blade-retracting mechanism also is set on the optical fiber cutting knife, and it is composed of 3 pieces (here in three pieces, for example, but not limited to three) of similar or dissimilar magnet set on the cutting tool post 1 and the blade guide rail 4 respectively. A decorative cover 11 of flat structure is set on the top of the described head cover 2, and a wear-resisting layer or lubrication coating layer is set on the hammer 15 on the back of the described decorative head cover 11.

Figure 3:
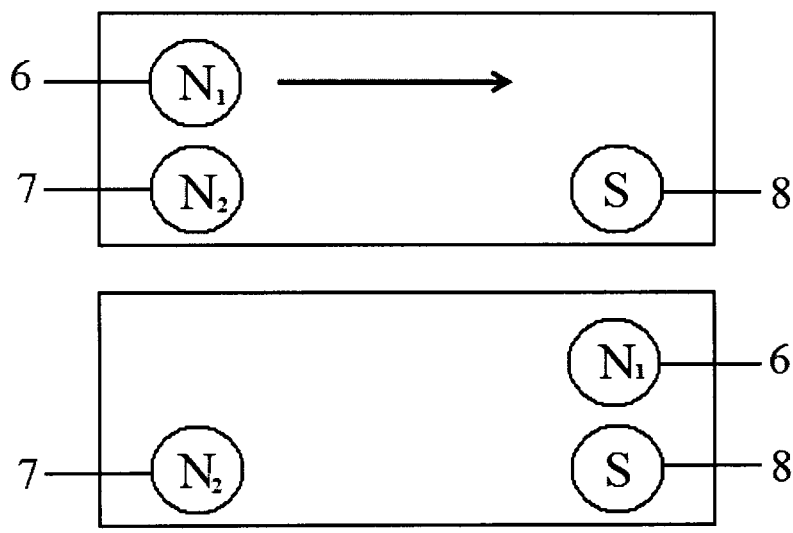
FIG. 3 is the principle schematic diagram of the automatic blade-retracting mechanism.

No. 1 magnet 6 (magnetic force is 4000 GS, N) is installed in the blade guide rail 4, and No. 2 magnet 7 (magnetic force is 8000 GS, N) and No. 3 magnet 8 (magnetic force is 4000 GS, S) are set on the cutting tool post. Along with the movement of the blade guide rail 4, when No. 1 magnet 6 moves to the location of No. 2 magnet 7, it will drive the blade guide 4 due to the reaction (similar rejection) automatically return to stop (dissimilar attraction) at the location of No. 3 magnet 8, realizing the automatic reset of the blade guide rail 4, as shown in FIG. 3.

That is to say, No. 1 magnet 6 is installed in the blade guide rail 4, and at least No. 2 magnet 7 and No. 3 magnet 8 respectively are set on the cutting tool post. No. 1 magnet 6 and No. 2 magnet 7 are similar, while No. 1 magnet 6 and No. 3 magnet 8 are dissimilar, and No. 3 magnet 8 is in the position where the blade 5 will automatically reset. Also to be sure, the number of No. 2 magnet 7 can be one or more pieces, and the number of No. 3 magnet 8 also can be one or more pieces. In general, No. 2 magnet 7 is located around the location where No. 1 magnet 6 arrives just now along with the said blade.

In order to achieve better reset effect, the magnetism of No. 2 magnet 7 is stronger than the one of the said No. 1 magnet 6. Above is only an example, just for explaining, and is not limited to the utility model.

The utility model of the optical fiber cutting knife also includes the optical fiber collector, see FIG. 4-7. An optical fiber collector 9 is set outside the cutting tool post 1 and near one side of the blade 5. At least one magnetic block and one magnetic column are correspondingly set on the top shell 18 and the bottom shell 19 of the optical fiber collector to make the top shell 18 and the bottom shell 19 keep open and/or closed status stably.

Figure 4:
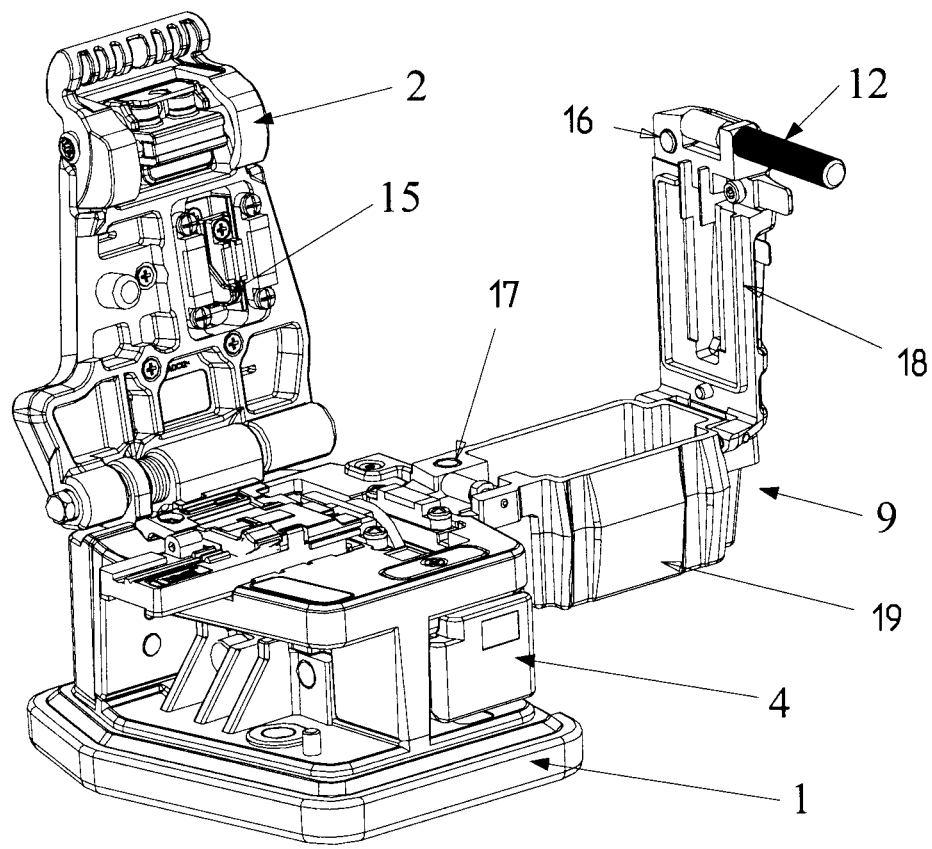
FIG. 4 is the stereoscopic structure diagram showing the situation when the head cover is open and the optical fiber collector is open.
Figure 5:
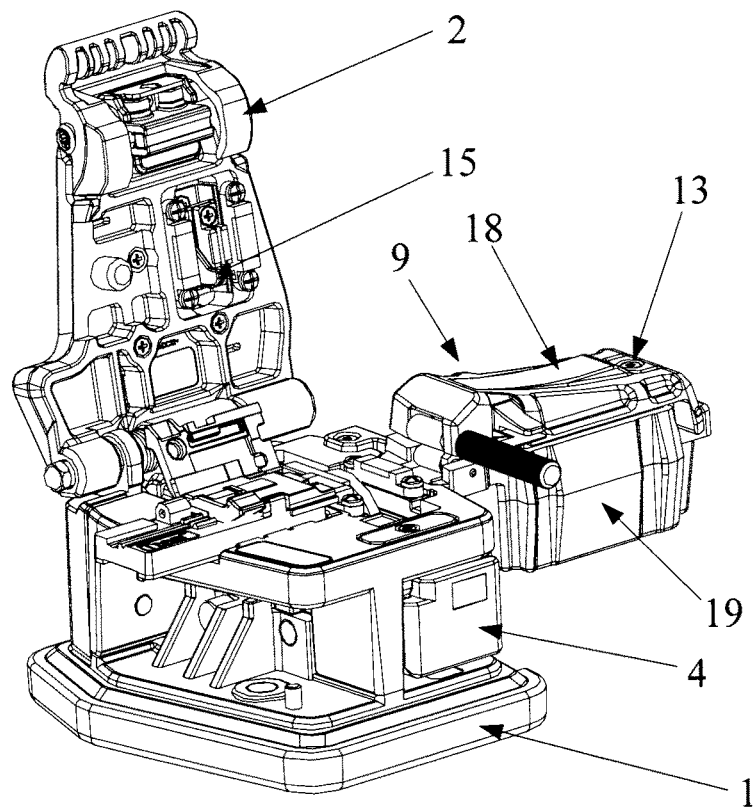
FIG. 5 is the stereoscopic structure diagram showing the situation when the head cover is open and the optical fiber collector is closed.
Figure 6:
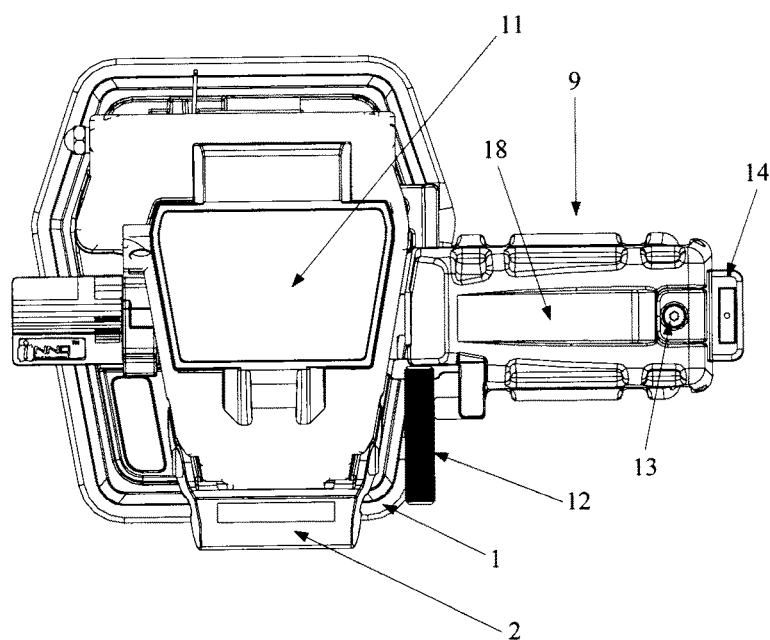
FIG. 6 is the top view of an embodiment of the utility model.
Figure 7:
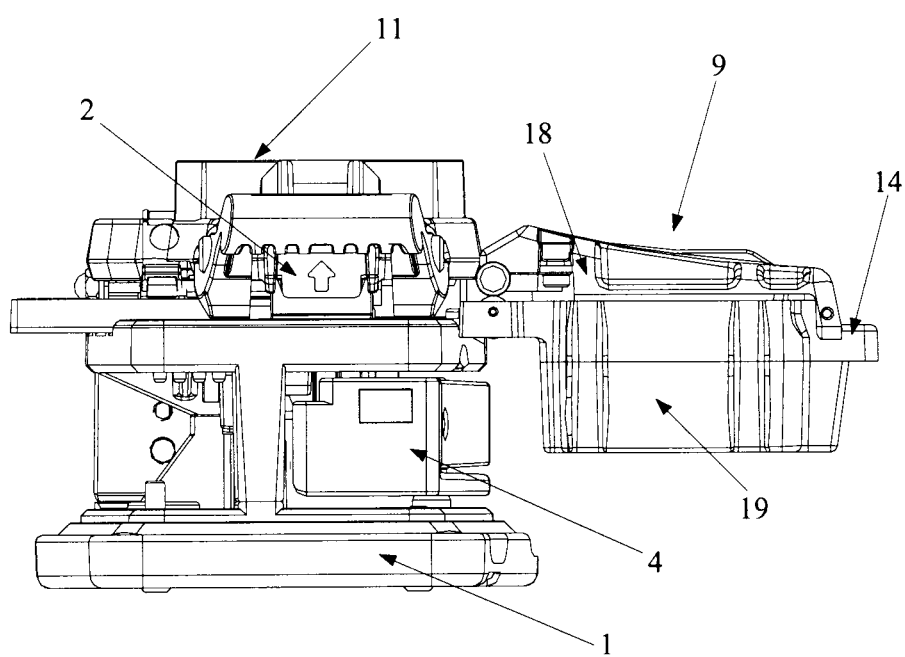
FIG. 7 is the side view of FIG. 6.

In general, the optical fiber collector 9 includes the top shell 18 and bottom shell 19 which are pin jointed to each other. The location of pin joint end is far away from the optical fiber cutting knife. The magnetic block and magnetic column are set on the top shell 18 and bottom shell 19 of the optical fiber collector correspondingly to make the top shell and bottom shell of the collector keep open and/or closed status stably. The number of magnetic block and magnetic column can be one or more. In this example, as shown in FIG. 5, 6, 7, at the pin joint of the top shell 18 and bottom shell 19 of the optical fiber collector, set No. 1 magnetic column 13 on the outer edge of the collector top shell 18, and set No. 1 magnetic block 14 (4500 GS, strong magnetic) on the outer edge of the collector bottom shell 19. As shown in FIG. 4, at the open and closed end of the top shell 18 and bottom shell 19 of the optical fiber collector, set No. 2 magnetic column 16 (2500 GS, weak magnetic) on the inner edge of the collector top shell 18, and set No. 2 magnetic block 17 on the inner edge of the collector bottom shell 19. As a further preferable implementation, but without limiting the utility model, in order to achieve better effect, the magnetism of No. 1 magnet 14 is stronger than the one of No. 2 16.

The utility model is suitable for the single mode or multimode silica fiber, and the work principle is as follows: when we need to cut the fiber, firstly we should open the head cover 2, and open the head shell 18 of the optical fiber collector. At this time, No. 1 magnetic column 13 set on the outer edge of the collector top shell 18 automatically stick closely to No. 1 magnetic block 14 due to the force of its 4500 GS strong magnetic suction, so that the optical fiber collector 9 will keep in the work condition of the open status stably (namely the top shell of the fiber collector is not easy to automatically closed, and affect the next action of placing the fiber), as shown in FIG. 4.

Then, to process the action of cutting, when using, use fiber peel pliers to remove fiber surface cladding firstly, about 30 to 40 mm reserved, dip in with alcohol cotton wool cover the bare fiber, and clean the fiber again. Then put the cleaned optical fiber into the fiber placing groove 3, close the optical fiber collector top shell 18, close the head cover 2, push the blade guide rail 4 at the same time, and cut the fiber through the blade 5 fixed on the blade guide rail 4, namely put No. 1 magnet 6 along with the blade guide rail 4 to the location of No. 2 magnet 7, push up the head cover 2 by hand to complete cutting an optical fiber. Open the head cover 2, counterclockwise rotate the fiber volume axis 12, through which can spin the waste fiber after cutting into the fiber collector 9.

After all the waste optical fiber enter the collector 9, open the top shell 18 of the collector 9, so the fiber collector 9 will go back into the working condition of open status stably. When push up the head cover 2, No. 1 magnet 6 drives the blade guide 4 to automatically reset due to the reaction (similar rejection) between No. 1 magnet 6 and No. 2 magnet 7, returning to stop (dissimilar attraction) at the location of No. 3 magnet 8, and then enter the working condition.

The utility model utilizes the magnetic force to control fiber collector to open and close, making the fiber collector keep open and/or closed status stably if necessarily. The process is simple, easy to use, and of good using effect.

A decorative cover 11 of flat structure is set on the head cover 2 of the utility model of the optical fiber cutting knife. From the vertical view in the attached FIG. 6 we can clearly see that the top decoration cover 11 is designed to a plane, and in FIG. 1, attached FIG. 2 and FIG. 7 we can also observe the profile shape (the upper part, a flat line).

The design of the flat structure is mainly for the sake of convenient and practical operation. The implementing scheme of specific engineering construction is as follows: workers cut the optical fiber that need to be weld, then weld the two cut optical fibers, and there are several tinier optical fibers in one cable (some models include 6 optical fibers, and some models include 12 optical fibers), so a piece of optical fiber after welding needs to be temporarily placed, and after several other optical fibers are welded and synthesized into a cable can the fiber scroll operation be done.

The decorative head cover of the flat structure of the utility model provides short-time weld fiber placement, reduce the further damage risk of the weld fiber, facilitating the following operation, and greatly improving the work efficiency. The decorative head cover 11 changes from the original decorative protuberance structure into a practical flat structure, and it can be used as a small work station to place weld fibers, greatly increasing the practicality in the process of actual operation.

A wear-resisting layer or lubrication coating layer is set on the hammer 15 on the back of the decorative head cover 11. The hammer 15 is set on the back of the decorative head cover 11, as shown in FIG. 4, 5, a spring is set between hammer 15 and the decorative head cover 11, and a bulge is set on the blade guide rail 4. When the optical fiber cutting knife works, that is, the head cover 2 closes, the hammer 15 collide with the bulge of the blade guide rail 4, the hammer 15 retracts upward due to the force caused by the bulge of the blade guide rail 4, and the spring gets in the compression status.

When the blade guide rail 4 is pushed for optical fiber cutting, the bulge of the blade guide rail 4 slides along with the blade and abrades with the hammer at the same time, until it slides to the position where there is no contact with the hammer 15 (Namely No. 1 magnet 6 with the blade guide rail 4 slide to the location of No. 2 magnet 7), and at this time the hammer 15 bumps downward under the tension of the top spring, and stuck the edge of the bulge of the blade guide rail 4 at the same time.

At this time the optical fiber is cut over, push up the head cover 2, then the hammer 15 no longer sticks the edge of the bulge of the blade guide rail 4, No. 1 magnet 6 drives the blade guide 4 to automatically reset due to the reaction (similar rejection) between No. 1 magnet 6 and No. 2 magnet 7, returning to stop (dissimilar attraction) at the location of No. 3 magnet 8, then the cutting knife will enter working condition again.

The friction frequency of the hammer of the optical fiber cutting knife is so high that it belongs to the easy aging component, so the spray lubrication and wear handling to the hammer 15 of this utility model greatly improve the wear resistance of the actual operation and improve the working life of the hammer 15, so as to improve the service life of the whole optical fiber cutting knife.

Of course, the utility model is not limited to one optical fiber cutting knife of this type. In general, it only includes the cutting tool post, head cover, blade guide rail and the blade fixed on the blade guide rail. The head cover is installed on the cutting tool post, and the blade guide rail is placed on the outside of the cutting tool post. The top of the described head cover is a decorative cover of flat structure. A wear-resisting layer or lubrication coating layer is set on the hammer on the back of the described decorative head cover.

An optical fiber collector is set outside the cutting tool post and near one side of the blade. The magnetic block and magnetic column are corresponding set on the head and the bottom shell of the optical fiber collector to make the head and bottom shell of the collector keep open and/or closed status stably.

An implementation scheme is as follows: at the pin joint of the top shell and bottom shell of the optical fiber collector No. 1 magnetic block and No. 1 magnetic column are correspondingly set on. At the open and closed end of the top shell and bottom shell of the optical fiber collector No. 2 magnetic block and No. 2 magnetic column are correspondingly set on. In order to achieve better effect, the magnetism of No. 1 magnet is stronger than the one of No. 2.

As long as the optical fiber cutting knife uses magnets to realize automatic reset the implementation, it should fall into the protection scope of the utility model.

As long as the top of the decorative head cover of the optical fiber cutting knife is of flat structure, it should fall into the scope of the protection of the utility model.

As long as the spray lubrication or wear handling is set to the hammer of the optical fiber cutting knife, it should fall into the scope of the protection of the utility model.

As long as the optical fiber cutting knife utilizes the magnetic force to control fiber collector open and close, making the fiber collector keep open or closed status stably, it should fall into the scope of the protection of the utility model.

The above disclosed are only several specific embodiments of this application, but this application is not limited to the above, and any changes thought by those skilled in this field should fall into the scope of the protection of this application.

The invention claimed is:
1. An optical fiber cutting knife, comprising:
a cutting tool post,
a head cover,
a flat decorative cover on top of the head cover, a lubrication coating layer on a hammer on a back of the decorative cover,
a fiber placing groove,
a blade guide rail,
a blade fixed on the blade guide rail,
a first magnet of a first polarity installed in the blade guide rail, and a second magnet of the first polarity and a third magnet of a second polarity installed on the cutting tool post, wherein the first magnet and the third magnet have a same amount of magnetic force with different polarities, and the first magnet and the second magnet have a same polarity with different amount of magnetic forces;
the head cover being installed on the cutting tool post, the fiber placing groove being installed inside the cutting tool post, and the blade guide rail being placed on an outside of the cutting tool post, wherein: the first magnet moves from a location corresponding to the second magnet to a location corresponding to the third magnet to form an automatic blade-retracting mechanism to automatically reset a position of the blade guide rail, the first polarity being different from the second polarity.

2. The optical fiber cutting knife according to claim 1, wherein: the second magnet repels the first magnet and the third magnet attracts the first magnet, the third magnet being at a position that the position of the blade guide rail is reset.

3. The optical fiber cutting knife according to claim 2, wherein: a position of the second magnet is in a proximity of the position of the first magnet in the blade guide rail.

4. The optical fiber cutting knife according to claim 2, wherein: a magnetism of the second magnet is stronger than a magnetism of the first magnet.

5. The optical fiber cutting knife according to claim 1, wherein: an optical fiber collector is set outside the said cutting tool post and near one side of the blade, and a magnetic block and a magnetic column are correspondingly set on a top shell and a bottom shell of the optical fiber collector in order to make the top shell and bottom shell of the collector keep in stable states of open and closed.

6. The optical fiber cutting knife according to claim 5, wherein: a first magnetic block and a first magnetic column are set correspondingly at a pin joint of the top shell and bottom shell of the optical fiber collector.

7. The optical fiber cutting knife according to claim 5, wherein: a second magnetic block and a second magnetic column are correspondingly set at an open and closed end of the top shell and bottom shell of the optical fiber collector.

8. The optical fiber cutting knife according to claim 7, wherein: a magnetism of the first magnet is stronger than a magnetism of the said No. 2.

9. The optical fiber cutting knife according to claim 1, wherein: an optical fiber collector is set outside the cutting tool post and near one side of the blade, and the magnetic block and magnetic column are correspondingly set on the top shell and the bottom shell of the optical fiber collector in order to make the top shell and bottom shell of the collector keep in stable status of opening and closing.

10. The optical fiber cutting knife according to claim 9, wherein: the first magnetic block and the first magnetic column are set correspondingly at the pin joint of the top shell and bottom shell of the optical fiber collector.

11. The optical fiber cutting knife according to claim 9, wherein: the second magnetic block and the second magnetic column are correspondingly set at the open and closed end of the top shell and bottom shell of the optical fiber collector.

12. The optical fiber cutting knife according to claim 11, wherein: the magnetism of the first magnet is stronger than the magnetism of the second magnet.

13. The optical fiber cutting knife according to claim 6, wherein: the second magnetic block and the second magnetic column are correspondingly set at the open and closed end of the top shell and bottom shell of the optical fiber collector.

14. The optical fiber cutting knife according to claim 10, wherein: the second magnetic block and the second magnetic column are correspondingly set at the open and closed end of the top shell and bottom shell of the optical fiber collector.

15. The optical fiber cutting knife according to claim 1, further comprising a wear-resisting layer on a hammer on a back of the decorative cover.

16. The optical fiber cutting knife according to claim 1, wherein the flat decorative cover has an approximately trapezoidal-shaped flat portion that is used as a work station to place weld fibers.

17. The optical fiber cutting knife according to claim 1, further comprising:
a level for opening the head cover by using leverage principle, wherein:
the level is connected with the head cover by screws;
the level includes a curved bottom surface that is connected with a flat top surface of the cutting tool post; and
when the level rotates around an axis of the screws, the curved bottom surface slides along the flat top surface of the cutting tool post to lift up the axis.

18. The optical fiber cutting knife according to claim 1, wherein a magnetic force of the second magnet is twice of the magnetic force of the first magnet.

19. The optical fiber cutting knife according to claim 18, wherein the magnetic force of the first magnet is 4000 GS, the magnetic force of the second magnet is 8000 GS, and the magnetic force of the third magnet is 4000 GS.

* * * * *